(12) United States Patent
Kim et al.

(10) Patent No.: US 10,479,696 B2
(45) Date of Patent: Nov. 19, 2019

(54) METHOD FOR PREPARING MOLYBDENUM OXIDE NANOPARTICLES

(71) Applicant: University-Industry Cooperation Group of Kyung Hee University, Yongin-si, Gyeonggi-do (KR)

(72) Inventors: Jinsoo Kim, Seongnam-si (KR); Sang Hyuk Im, Yongin-si (KR); Su Ha, Suwon-si (KR); Han-Seul Choi, Seoul (KR); Woo-Sik Kim, Seoul (KR); Sung Pil Yoon, Seongnam-si (KR); Jonghee Han, Seoul (KR)

(73) Assignee: University-Industry Cooperation Group of Kyung Hee University, Yongin-si, Gyeonggi-do (KR)

( * ) Notice: Subject to any disclaimer, the term of this patent is extended or adjusted under 35 U.S.C. 154(b) by 596 days.

(21) Appl. No.: 15/178,609

(22) Filed: Jun. 10, 2016

(65) Prior Publication Data
US 2016/0362303 A1     Dec. 15, 2016

(30) Foreign Application Priority Data

Jun. 12, 2015   (KR) .................. 10-2015-0083460

(51) Int. Cl.
*C01G 39/02*     (2006.01)
*B01J 2/04*      (2006.01)

(52) U.S. Cl.
CPC ............ *C01G 39/02* (2013.01); *B01J 2/04* (2013.01); *C01P 2002/72* (2013.01); *C01P 2004/03* (2013.01); *C01P 2004/64* (2013.01); *C01P 2006/12* (2013.01)

(58) Field of Classification Search
CPC ........ C01G 39/02; B01J 2/04; C01P 2002/72; C01P 2004/03; C01P 2004/64; C01P 2006/12
See application file for complete search history.

(56) References Cited

U.S. PATENT DOCUMENTS

2011/0218286 A1* 9/2011 Yadav ............... B22F 1/0018
                                                    524/404
2013/0090511 A1* 4/2013 Soultanidis ......... B01J 21/08
                                                    585/653

OTHER PUBLICATIONS

Zhao et al (NPL: "Thermal Oxidation synthesis hollow MoO3 microspheres and their applications in lithium storage and gas sensing", 2018, Materials Research Bulletin 48, pp. 2289-2295).*

(Continued)

*Primary Examiner* — Melvin C. Mayes
*Assistant Examiner* — Smita S Patel
(74) *Attorney, Agent, or Firm* — Revolution IP, PLLC

(57) ABSTRACT

Provided is a method for preparing molybdenum oxide nanoparticles, including (a) preparing a precursor solution by dissolving a molybdenum salt in a first polar solvent, (b) generating an aerosol by applying ultrasonic waves to the precursor solution, and spraying the aerosol to a pre-heated reactor using a carrier gas, (c) obtaining molybdenum oxide micron-sized particles by pyrolyzing the aerosol, and (d) obtaining molybdenum oxide nanoparticles by dispersing the molybdenum oxide micron-sized particles in a second polar solvent and performing a solvothermal reduction reaction.

15 Claims, 6 Drawing Sheets

(56) References Cited

OTHER PUBLICATIONS

Hanseul Choi, et al., "Production of molybdenum oxide particles with high yield by ultrasonic spray pyrolysis and their catalytic activity toward partial oxidation of n-dodecane", Journal of Analytical and Applied Pyrolysis, Feb. 1, 2015, pp. 276-283, vol. 112.

Xiangying Chen, et al., "Selective synthesis of metastable MoO2 nanocrystallites through a solution-phase approach", Chemical Physics Letters, Nov. 10, 2005, pp. 105-108, vol. 418.

\* cited by examiner

METHOD FOR PREPARING MOLYBDENUM OXIDE NANOPARTICLES

CROSS-REFERENCE TO RELATED APPLICATION

This application claims priority to and the benefit of Korean Patent Application No. 2015-0083460, filed on Jun. 12, 2015, the disclosure of which is incorporated herein by reference in its entirety.

BACKGROUND

1. Field of the Invention

The present invention relates to a method for preparing molybdenum oxide nanoparticles, and more particularly, to a method for preparing molybdenum oxide nanoparticles by a solvothermal reduction reaction.

2. Discussion of Related Art

Molybdenum trioxide ($MoO_3$) is used as a semiconductor material, a field emitter, an electrochromic material, a photochromic material, and a gas sensor. Conventionally, pure molybdenum trioxide was synthesized in various forms including nanorods, nanobelts, nanofibers, etc.

Molybdenum trioxide may be converted into molybdenum dioxide by reduction with hydrogen. Molybdenum dioxide is in the limelight as a fuel reforming catalyst, a selective cathode material for a solid oxide fuel cell, etc. due to sulfuric acid tolerance and coke resistance in partial oxidation of a hydrocarbon compound.

Generally, molybdenum oxide is synthesized by a hydrothermal method and solvothermal synthesis at 120 to 200° C. The hydrothermal method and the solvothermal synthesis have advantages in which solubility of a ceramic precursor may be easily controlled, high purity particles may be prepared, and sizes and shapes of the particles may be easily controlled according to temperature, pressure, concentration of the precursor, time, etc.

However, it has been noted that the hydrothermal method and the solvothermal synthesis are not appropriate for large scale synthesis due to the formation of large particles with broad size distribution. Thus, a synthesis method is needed for preparing molybdenum oxide nanoparticles with uniform shapes on a large scale.

SUMMARY OF THE INVENTION

The present invention is directed to providing a method for producing molybdenum oxide nanoparticles with a uniform size on a large scale.

In one aspect of the present invention, a method for preparing molybdenum oxide nanoparticles is provided, the method including: (a) preparing a precursor solution by dissolving a molybdenum salt in a first polar solvent; (b) generating an aerosol by applying ultrasonic waves to the precursor solution, and spraying the aerosol to a pre-heated reactor using a carrier gas; (c) obtaining molybdenum oxide micron-sized particles by pyrolyzing the aerosol; and (d) obtaining molybdenum oxide nanoparticles by dispersing the molybdenum oxide micron-sized particles in a second polar solvent and performing a solvothermal reduction reaction.

In one exemplary embodiment, the molybdenum salt may be one selected from the group consisting of lithium molybdate ($Li_2MoO_4$), calcium molybdate ($CaMoO_4$), potassium molybdate ($K_2MoO_4$), sodium molybdate ($NaMoO_4$), molybdenum chloride ($MoCl_5$, $MoCl_3$, $MoOCl_4$), ammonium molybdate (($NH_4)_6Mo_7O_{24}\cdot H_2O$), and a mixture thereof.

In one exemplary embodiment, the first polar solvent may be one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethylsulfoxide, distilled water, and a mixture thereof.

In one exemplary embodiment, a concentration of the precursor solution may be 0.05 to 0.5 M.

In one exemplary embodiment, the carrier gas may be one selected from the group consisting of air, nitrogen, oxygen, helium, argon, and a mixture thereof.

In one exemplary embodiment, in the step (c), the pyrolysis temperature may be 450 to 650° C.

In one exemplary embodiment, in the step (c), the molybdenum oxide micron-sized particles may be molybdenum trioxide ($MoO_3$).

In one exemplary embodiment, the second polar solvent may be a mixture of distilled water and a reducing solvent.

In one exemplary embodiment, the second polar solvent may be prepared by mixing the distilled water and the reducing solvent in a weight ratio of 1 to 3:1.

In one exemplary embodiment, in the step (c), the pyrolysis temperature may be 560 to 640° C.

In one exemplary embodiment, in the step (d), the solvothermal reduction reaction may be performed at least for 10 hours.

In one exemplary embodiment, in the step (c), the pyrolysis temperature may be 460 to 540° C.

In one exemplary embodiment, in the step (d), the solvothermal reduction reaction may be performed at least for 2 hours.

In one exemplary embodiment, in the step (d), the solvothermal reduction reaction temperature may be 100 to 300° C.

In one exemplary embodiment, the molybdenum oxide nanoparticles may be represented by Formula 1.

$$MoO_{3-X} \qquad \text{[Formula 1]}$$

In Formula 1, X is $0 < X \leq 1$.

In one exemplary embodiment, the molybdenum oxide micron-sized particles may be polycrystalline.

In one exemplary embodiment, the molybdenum oxide nanoparticles may have a Brunauer-Emmett-Teller (BET) specific surface area of at least 100 $m^2/g$.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
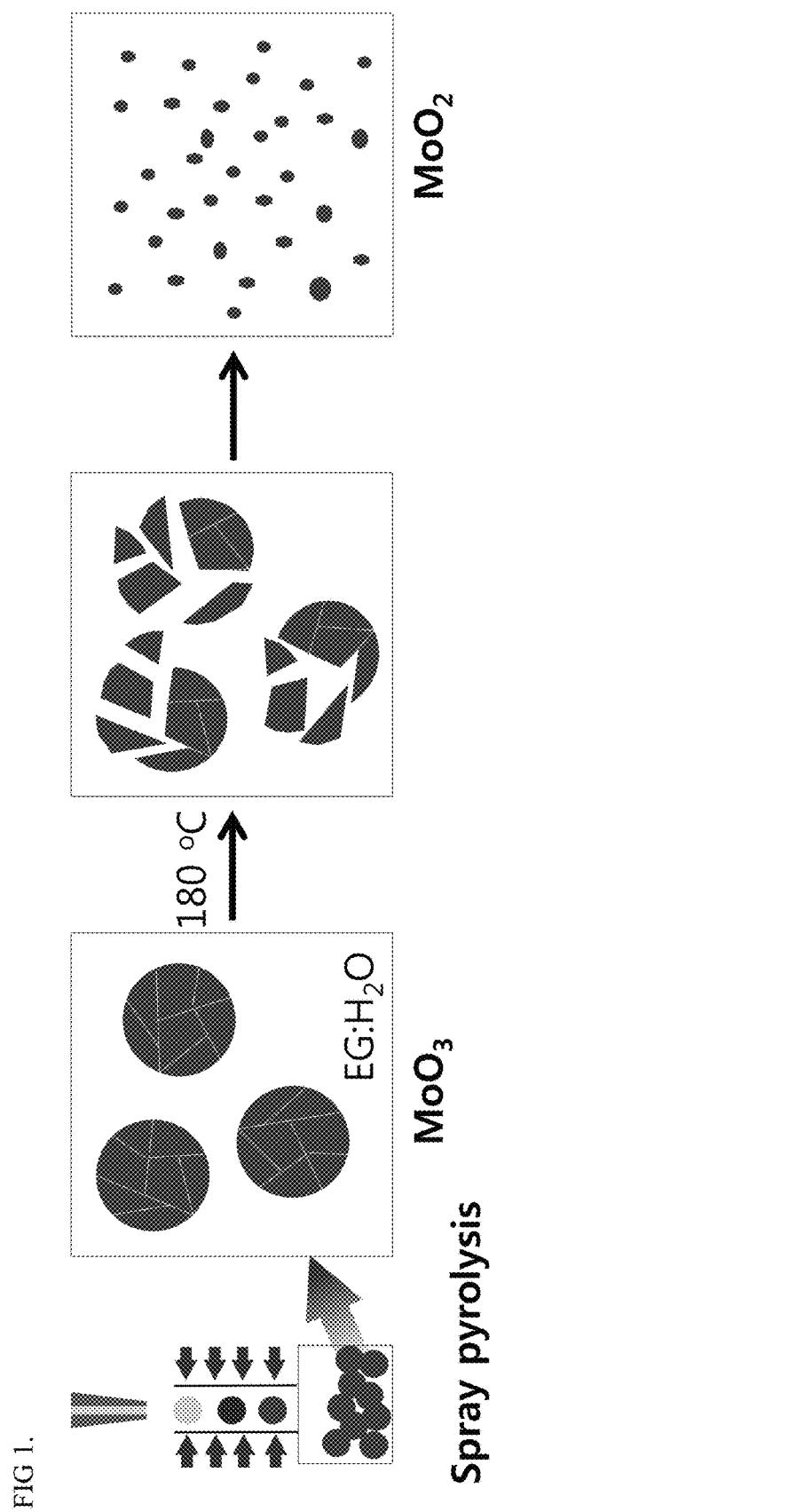
FIG. 1 illustrates a method for preparing molybdenum oxide nanoparticles according to an exemplary embodiment of the present invention.

Hereinafter, the present invention will be described with reference to the accompanying drawings. However, the present invention may be realized in various different forms and therefore is not limited to exemplary embodiments that will be described below. In addition, to clearly describe the present invention, parts unrelated to the description will be omitted in the drawings, and like reference numerals denote like parts throughout the specification.

In the specification, when a part is "connected" with another part, they may not only be "directly connected" to each other but also be "indirectly connected" to a third member. Also, when a part "includes" a certain component, it means that, unless particularly defined otherwise, another component may not be excluded but further include another component.

Hereinafter, exemplary embodiments of the present invention will be described with reference to the accompanying drawings.

In one exemplary embodiment of the present invention, a method for preparing molybdenum oxide nanoparticles is provided, the method comprising: (a) preparing a precursor solution by dissolving a molybdenum salt in a first polar solvent; (b) generating an aerosol by applying ultrasonic waves to the precursor solution and spraying the aerosol to a pre-heated reactor using a carrier gas; (c) obtaining molybdenum oxide micron-sized particles by pyrolyzing the aerosol; and (d) obtaining molybdenum oxide nanoparticles by dispersing the molybdenum oxide micron-sized particles in a second polar solvent and performing a solvothermal reduction reaction.

In the step (a), a precursor solution may be prepared by dissolving a molybdenum salt in a first polar solvent.

The molybdenum salt may be one selected from the group consisting of lithium molybdate ($Li_2MoO_4$), calcium molybdate ($CaMoO_4$), potassium molybdate ($K_2MoO_4$), sodium molybdate ($NaMoO_4$), molybdenum chloride ($MoCl_5$, $MoCl_3$, $MoOCl_4$), ammonium molybdate (($NH_4$)$_6Mo_7O_{24}\cdot H_2O$), and a mixture thereof, and preferably, ammonium molybdate, but the present invention is not limited thereto.

The first polar solvent may be one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethylsulfoxide, distilled water, and a mixture thereof, and preferably, distilled water, but the present invention is not limited thereto.

A concentration of the precursor solution may be 0.05 to 0.5 M and preferably, 0.1 to 0.5 M. When the concentration of the precursor solution is less than 0.05 M, it is difficult to synthesize spheral molybdenum oxide particles due to insufficient Mo ions, and when the concentration of the precursor solution is more than 0.5 M, the shape and size of the synthesized molybdenum oxide particles may not be uniform.

In the step (b), an aerosol may be generated by applying ultrasonic waves to the precursor solution and then sprayed into a pre-heated reactor using a carrier gas.

Since a container containing the precursor solution includes a plurality of nebulizers with a predetermined frequency, an aerosol may be generated on a surface of the precursor solution by the nebulizers. The aerosol may be sprayed into the reactor by being moved along a pipe line via the carrier gas.

The carrier gas may be one selected from the group consisting of air, nitrogen, oxygen, helium, argon, and a mixture thereof, and preferably, nitrogen, but the present invention is not limited thereto. Since residence time in the reactor of a reactant which is the aerosol is determined by a flow rate of the carrier gas, the flow rate of the carrier gas may be controlled so that the residence time is approximately two seconds.

In the step (c), the sprayed aerosol may be dried, condensed, precipitated, solidified, and sintered through the reactor heated to a predetermined temperature, thereby synthesizing and obtaining the molybdenum oxide micron-sized particles.

The pyrolysis temperature may be 300 to 650° C., preferably, 450 to 650° C., and more preferably, 500 to 600° C. When the pyrolysis temperature is less than 450° C., the precursor solution is not completely pyrolyzed, and thus it is difficult to synthesize the molybdenum oxide particles, and when the pyrolysis temperature is more than 650° C., the molybdenum oxide particles may be formed in various shapes in addition to a sphere, and thus may not be uniform in shape.

In the steps (a) and (b), when the same polar solvent and the same carrier gas are used, for example, distilled water as the polar solvent and nitrogen as the carrier gas are used, the molybdenum oxide micron-sized particles synthesized and obtained in the step (c) may be molybdenum trioxide ($MoO_3$).

Meanwhile, in the step (d), molybdenum oxide nanoparticles may be obtained by dispersing the molybdenum oxide micron-sized particles in a second polar solvent and performing a solvothermal reduction reaction.

The second polar solvent may be a mixture of distilled water and a reducing solvent.

A type of the reducing solvent is not particularly limited as long as the molybdenum trioxide($MoO_3$) micron-sized particles obtained in the step (c) can be sequentially reduced to molybdenum dioxide ($MoO_2$) nanoparticles under predetermined conditions. For example, the reducing solvent may be a diol-, polyol-, glycol- or glycolether-type compound, glycerol, glucose, dimethylformamide, dimethylacetamide, ascorbic acid, citric acid, hydrazine hydrate, sodium hydride, hydroquinone, sodium borohydride, or a mixture thereof, and preferably, ethyleneglycol, but the present invention is not limited thereto.

The second polar solvent may be prepared by mixing the distilled water and the reducing solvent in a weight ratio range of 1 to 3:1. When a ratio of the reducing solvent is higher than the distilled water, an intermediate product or by-product such as $Mo_4O_{11}$ may be produced, and therefore yield of reduction to the molybdenum oxide nanoparticles may be reduced.

FIG. 1 illustrates a method for preparing molybdenum oxide nanoparticles according to an exemplary embodiment of the present invention.

Referring to FIG. 1, when the reducing solvent is ethyleneglycol, the ethyleneglycol may be converted into glycolaldehyde through heating, and the molybdenum trioxide micron-sized particles may be reduced to molybdenum dioxide by the glycolaldehyde. In detail, since orthorhombic molybdenum trioxide (Pbnm, a=3.697 Å, b=13.864 Å, c=3.963 Å) has a larger unit cell than monoclinic molybdenum dioxide (P21/c, a=5.6 Å, b=4.85 Å, c=5.53 Å) and about 34% of a volume of the unit cell may be converted into molybdenum dioxide from molybdenum trioxide through a phase transition, when a solution of the molybdenum trioxide micron-sized particles is heated, polycrystalline molybdenum trioxide micron-sized particles may be disassembled along a grain boundary through a thermal expansion, and the disassembled crystalline particles may be broken by solvothermal cracking.

The term "polycrystalline" used herein refers to being a group of single (or mono) crystals having different orientations, and the term "single crystal" means that a regular alignment of molecules is uniformly present throughout.

The solvothermal reduction reaction temperature may be 100 to 300° C., and preferably, 150 to 200° C. When the solvothermal reduction reaction temperature is less than 100° C., the distilled water component of the second polar solvent may not be evaporated, and when the solvothermal reduction reaction temperature is more than 300° C., size and shape uniformity of nanoparticles which is the product may be reduced.

As the size of the molybdenum oxide nanoparticles is considerably decreased by reducing the molybdenum trioxide micron-sized particles through a solvothermal reduction reaction, a BET specific surface area of the nanoparticles may be considerably increased, and the nanoparticles may be represented by Formula 1.

$$MoO_{3-X}$$  [Formula 1]

In Formula 1, X may be a real number satisfying the range of $0<X\leq1$, and preferably, X is 1. That is, as the reduction of the molybdenum trioxide micron-sized particles progresses, molybdenum oxide nanoparticles with various molar ratios may be sequentially or simultaneously produced, however the final product may be molybdenum dioxide ($MoO_2$) nanoparticles. Here, the BET specific surface area of the molybdenum dioxide nanoparticles may be at least 100 $m^2$/g, and preferably, 100 to 200 $m^2$/g. As the BET specific surface area of the molybdenum dioxide nanoparticles is increased approximately twice to four times that of the molybdenum dioxide nanoparticles obtained from the conventional monocrystalline molybdenum trioxide micron-sized particles, activity of the particles may be considerably improved.

Also, since the molybdenum dioxide nanoparticles produced by disassembling and breaking polycrystalline molybdenum trioxide micron-sized particles through the solvothermal cracking may be uniformly dispersed by minimizing unnecessary behaviors such as agglomeration between the particles, reliability of the nanoparticles to the high specific surface area may be ensured.

Also, in the step (c), as the pyrolysis temperatures are controlled differently within the above range, molybdenum trioxide micron-sized particles with different particle sizes and morphologies may be obtained, and therefore reaction time required to obtain molybdenum dioxide nanoparticles with a predetermined purity in the following step of a solvothermal reduction reaction may be differently controlled.

In detail, when the pyrolysis temperature is 560 to 640° C. (approximately 600° C.), the solvothermal reduction reaction may be performed for at least 10 hours and preferably 10 to 12 hours. When the reaction time is less than 10 hours, purity of the obtained molybdenum dioxide nanoparticles may be reduced, and when the reaction time is more than 12 hours, the surface area may be considerably reduced, and thus the activity of the nanoparticles may be reduced.

Also, when the pyrolysis temperature is 460 to 540° C. (approximately 500° C.), the solvothermal reduction reaction may be performed for at least 2 hours, and preferably 2 to 8 hours. When the reaction time is less than 2 hours, the purity of the obtained molybdenum dioxide nanoparticles may be reduced, and when the reaction time is more than 8 hours, the surface area may be considerably reduced, and therefore the activity of the nanoparticles may be reduced.

Hereinafter, the present invention will be described in detail with reference to examples as follows.

Example 1-1

200 mL of a 0.5 M precursor solution was prepared by dissolving 21.53 g of ammonium molybdate tetrahydrate (($NH_4$)$_6Mo_7O_{24}$·$4H_2O$, 81-83%, Aldrich) in distilled water at 400 rpm for 40 minutes.

The precursor solution was sprayed into a quartz tube reactor with a length of 1200 mm, an inner diameter of 30 mm and an outer diameter of 34 mm using a 1.7 MHz ultrasonic wave sprayer having six nebulizers, and here, nitrogen was used as a carrier gas, a flow rate was controlled to 4.8 to 6.7 L/min, and a residence time in the reactor was fixed to two seconds. A furnace was installed at an outer wall of the quartz tube reactor, and then a temperature in the reactor was set to 600° C. using a thermocouple and a PID temperature controller.

Polycrystalline molybdenum trioxide (hereinafter, referred to as "$MoO_3$") micron-sized particles were captured at the lower end of the quartz tube reactor using a Teflon filter, and a hot wire was put around the outer wall of the Teflon filter housing to prevent re-condensation of vapor, resulting in maximum yield.

0.3 g of the synthesized polycrystalline $MoO_3$ was mixed with a solvent prepared by mixing 40 ml each of distilled water and ethyleneglycol, thereby preparing a solution, and then the resultant solution was put into a Teflon-lined bomb-type autoclave for a solvothermal reduction reaction at 180° C. for 1 to 16 hours, subject to centrifugation for 30 minutes at 14,000 rpm, washed with deionized water three times, and dried at 90° C. for 12 hours, thereby obtaining molybdenum dioxide (hereinafter, referred to as "$MoO_2$") nanoparticles.

Experimental Example 1

Figure 2:
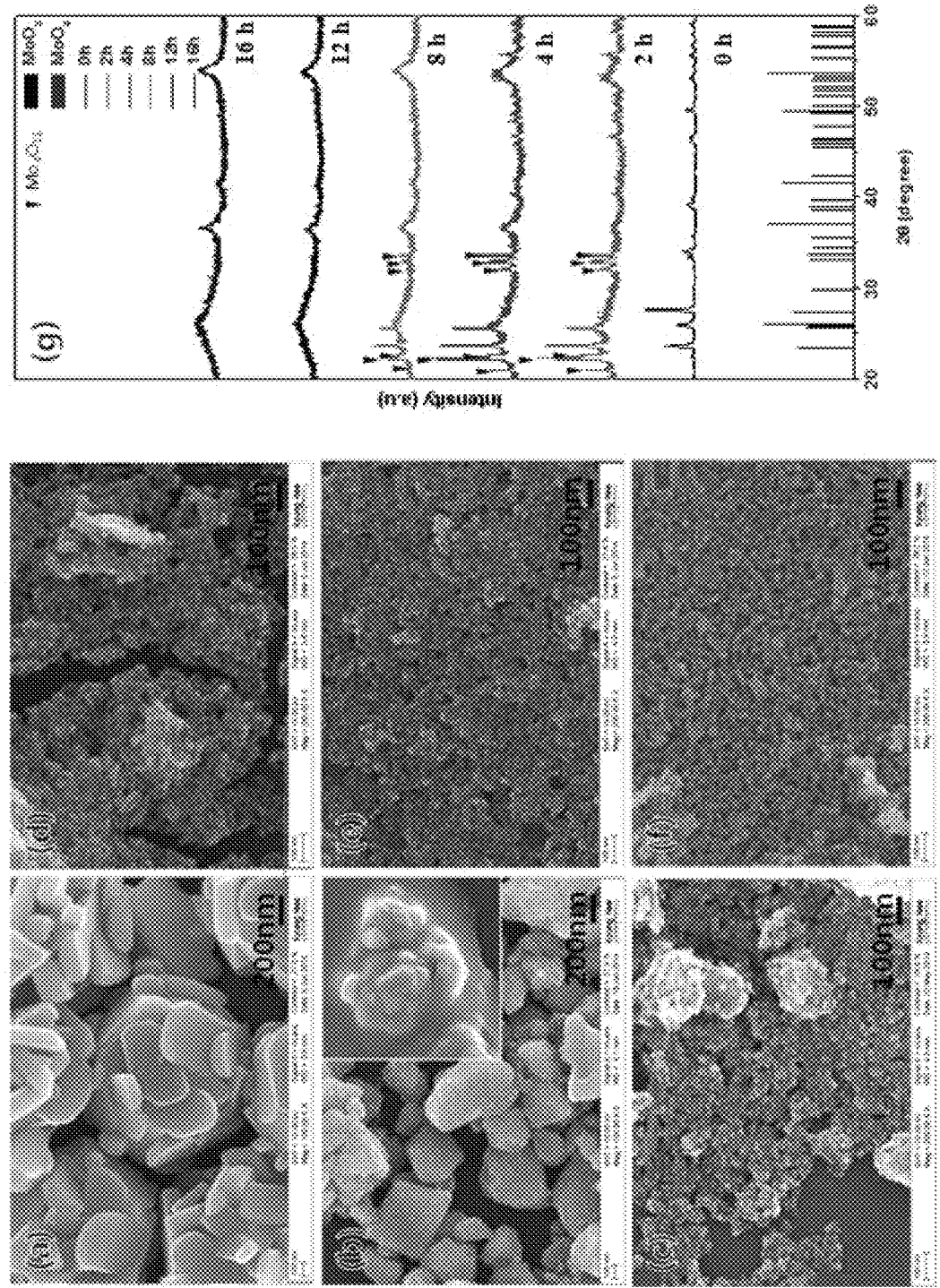
FIG. 2 illustrates SEM and XRD pattern analysis results depending on solvothermal reduction reaction time for molybdenum oxide nanoparticles according to an exemplary embodiment of the present invention.

SEM and XRD pattern analysis results for the produced $MoO_2$ nanoparticles according to a solvothermal reduction reaction time in Example 1-1 are shown in FIG. 2. The measuring and analyzing methods are as follows.

Shape and size: To observe surface microstructures and sizes of particles, FE-SEM (LeoSupra55, Carl Zeiss STM, Germany) was used. For a clear image, moisture in the particles was completely removed, and then a pre-treatment process of coating Pt by sputtering was performed to give electric conductivity onto a surface of the particle.

Structure and surface state: An XRD analysis was performed using an analyzer (trade name: MAC-18XHF;

Rigaku, Japan), and X-ray diffraction patterns were obtained by measuring 2θ from 20° to 80° using CuKα as a target source and an Ni-filter under conditions of 40 kV, 300 mA and a scanning rate of 6°/min.

FIG. 2(a) is an SEM image of polycrystalline $MoO_3$ micron-sized particles synthesized by spray pyrolysis. The $MoO_3$ micron-sized particles with a diameter of 1.5 μm or less are composed of plate-shaped crystalline particles with a thickness of 200 nm or less, and when reaction time is 0 hour, they are $MoO_3$ particles as can be seen in FIG. 2(g).

Referring to FIGS. 2(b) to 2(f), it can be seen that, as the solvothermal reduction reaction time is increased to 2 hours, 4 hours, 8 hours, 12 hours, and 16 hours, the polycrystalline $MoO_3$ micron-sized particles were sequentially disassembled or broken down to sub-micron-sized particles or nanoparticles through thermal expansion and cracking, and referring to FIG. 2(g), it can be seen that the composition of the particles changed from $MoO_3$ to $MoO_2$ by reduction, after 8 hours of the reaction, $Mo_4O_{11}$ and $MoO_3$ peaks almost dissipated, and therefore the purity of $MoO_2$ also considerably increased.

Example 1-2

$MoO_2$ nanoparticles were obtained by the same method as described in Example 1 except that a solvent prepared by mixing 60 ml of distilled water and 20 ml of ethyleneglycol was used in a solvothermal reduction reaction.

Comparative Example 1-1

$MoO_2$ nanoparticles were obtained by the same method as described in Example 1 except that pure water was used as a solvent (by hydrothermal synthesis) in a solvothermal reduction reaction.

Comparative Example 1-2

$MoO_2$ nanoparticles were obtained by the same method as described in Example 1 except that a solvent prepared by mixing 20 ml of distilled water and 60 ml of ethyleneglycol was used in a solvothermal reduction reaction.

Experimental Example 2

Figure 3:
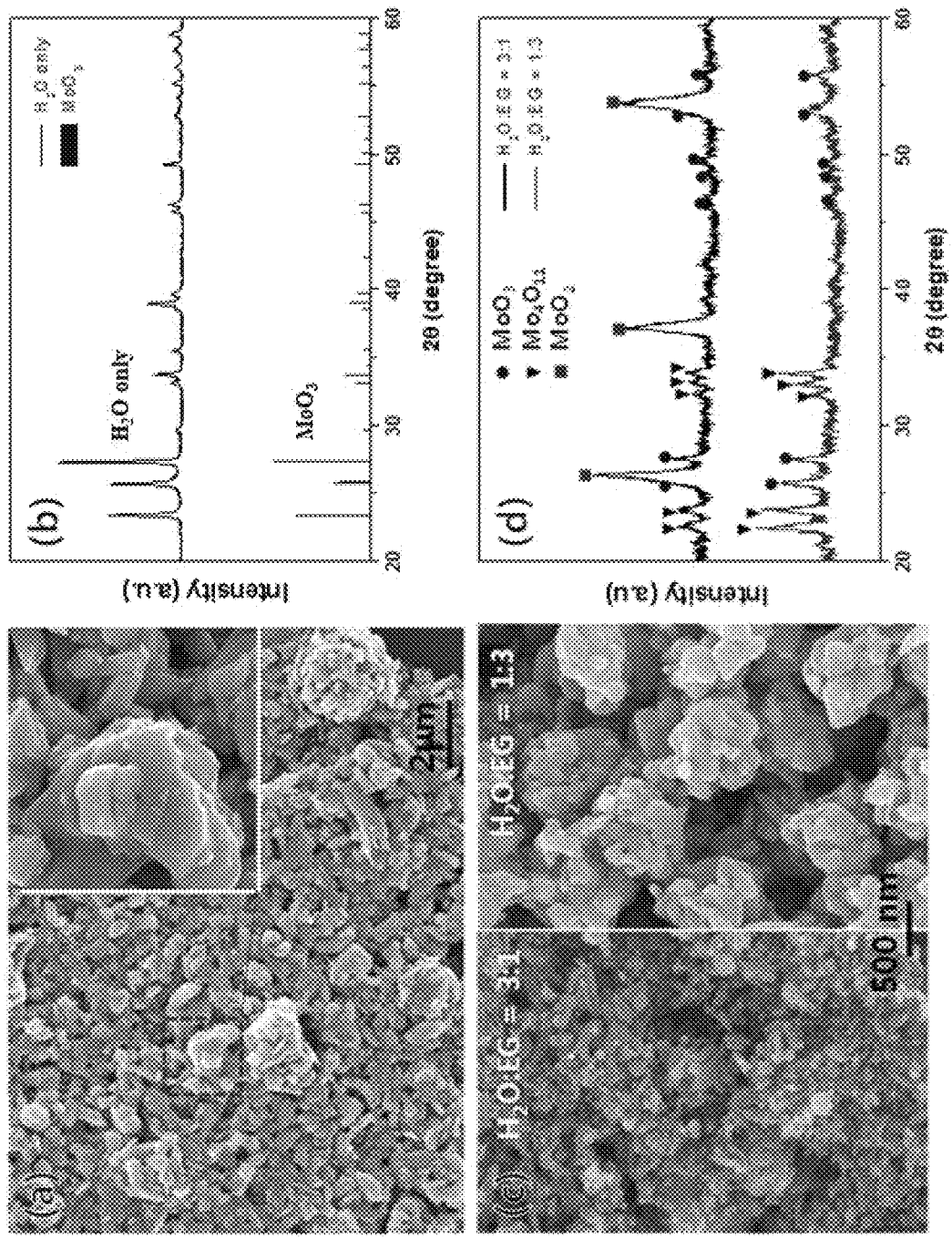
FIG. 3 illustrates SEM and XRD pattern analysis results depending on composition ratio of a polar solvent for molybdenum oxide nanoparticles according to an exemplary embodiment of the present invention.

SEM and XRD pattern analysis results for the $MoO_2$ nanoparticles obtained in Example 1-2, Comparative Example 1-1 and Comparative Example 1-2 are shown in FIG. 3.

Referring to FIG. 3(a), it can be seen that, while sub-micron-sized particles are also produced in Comparative Example 1-1 and therefore disassembly of the micron-sized particles partially progresses, since additional breaking, cracking or reduction was not accompanied, they are not the nanoparticles intended by the present invention, and FIG. 3(b) also shows that such sub-micron-sized particles have shapes similar to the $MoO_3$ micron-sized particles.

Referring to FIGS. 3(c) and 3(d), examining the shapes and compositions of the $MoO_2$ nanoparticles obtained in Example 1-2 and Comparative Example 1-2, most of products in Example 1-2 are nanoparticles, and among the nanoparticles, an $MoO_2$ peak is strongly shown, indicating that the purity of $MoO_2$ is very high.

Meanwhile, in Comparative Example 1-2, although enhancement of a reducing reaction is expected due to increase in ethyleneglycol content, particles with relatively large sizes were observed. The XRD pattern corresponding thereto also shows that the produced particles are a mixture of $MoO_3$ and $Mo_4O_{11}$ crystalline particles, not the $MoO_2$ nanoparticles.

Example 2

$MoO_2$ nanoparticles were obtained by the same method as described in Example 1-1 except that the temperature in a quartz tube reactor was controlled to 500° C.

Experimental Example 3

Figure 4:
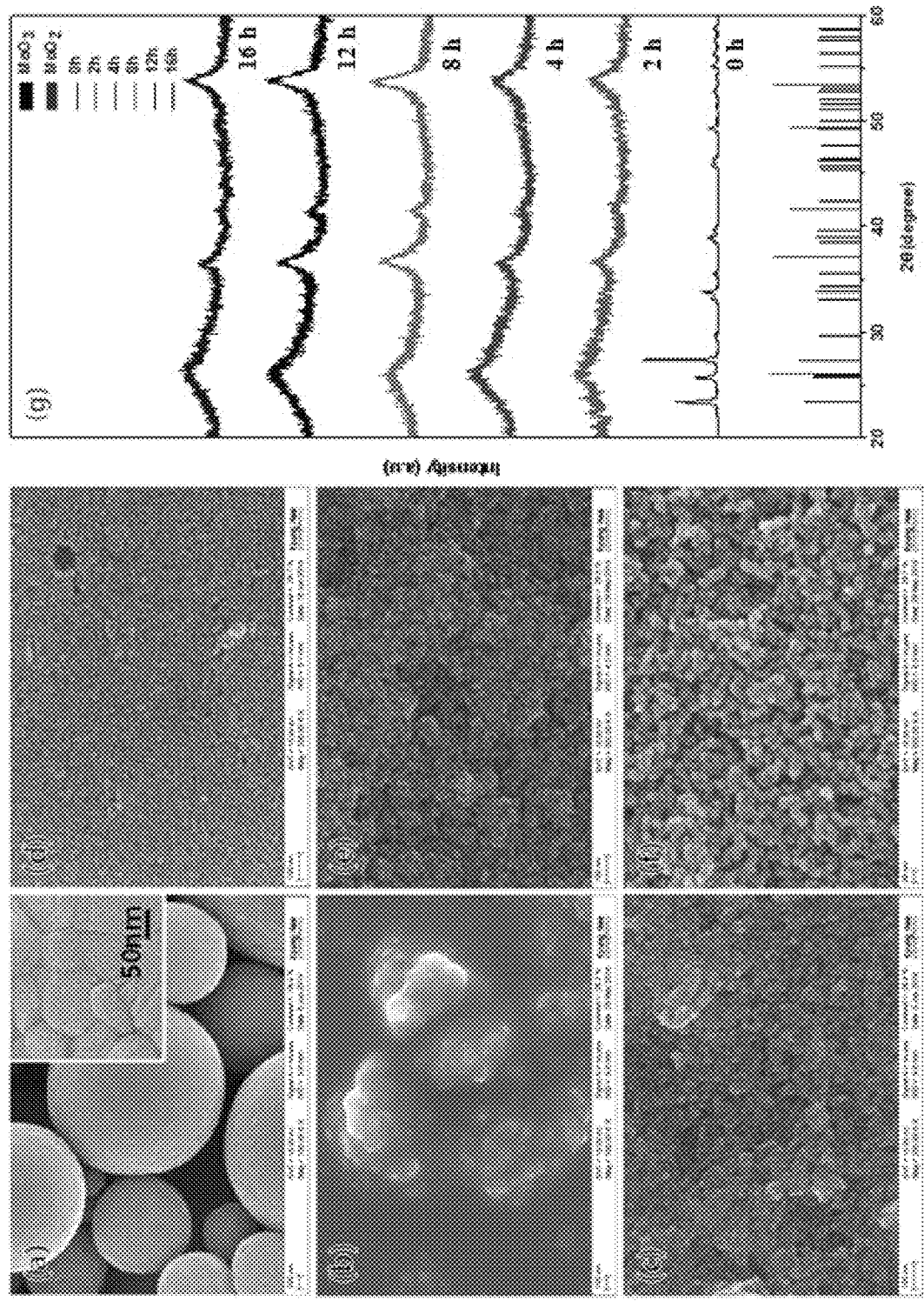
FIG. 4 illustrates SEM and XRD pattern analysis results depending on solvothermal reduction reaction time for molybdenum oxide nanoparticles according to an exemplary embodiment of the present invention.

SEM and XRD pattern analysis results for the $MoO_2$ nanoparticles produced according to a solvothermal reduction reaction time in Example 2 are shown in FIG. 4. Measuring and analyzing methods are the same as described in Experimental Example 1.

FIG. 4(a) is an SEM image of $MoO_3$ micron-sized particles synthesized by spray pyrolysis indicating that the particles, having a diameter of 500 to 2,000 nm, are composed of smaller crystalline particles than those synthesized in Example 1-1, and are pure $MoO_3$ particles when reaction time is 0 hour as may also be seen from FIG. 4(g).

Referring to FIGS. 4(b) to 4(f), it can be seen that, as the solvothermal reduction reaction time is increased to 2 hours, 4 hours, 8 hours, 12 hours, and 16 hours, the $MoO_3$ micron-sized particles were sequentially disassembled or broken down into sub-micron-sized particles or nanoparticles through thermal expansion or cracking, and referring to FIG. 4(g), it can be seen that the composition of the particles changed from $MoO_3$ to $MoO_2$ by reduction and $Mo_4O_{11}$ and $MoO_3$ peaks almost dissipated after 2 hours of the reaction, resulting in a considerably increase in purity of $MoO_2$.

Comparative Example 2

$MoO_2$ nanoparticles were obtained by the same method as described in Example 2 except that pure water was used as a solvent (by hydrothermal synthesis) in a solvothermal reduction reaction.

Comparative Example 3

$MoO_2$ nanoparticles were obtained by the same method as described in Example 1-2 except that commercially-available monocrystalline $MoO_3$ micron-sized particles were used instead of polycrystalline $MoO_3$ micron-sized particles synthesized from ammonium molybdate.

Experimental Example 4

Figure 5:
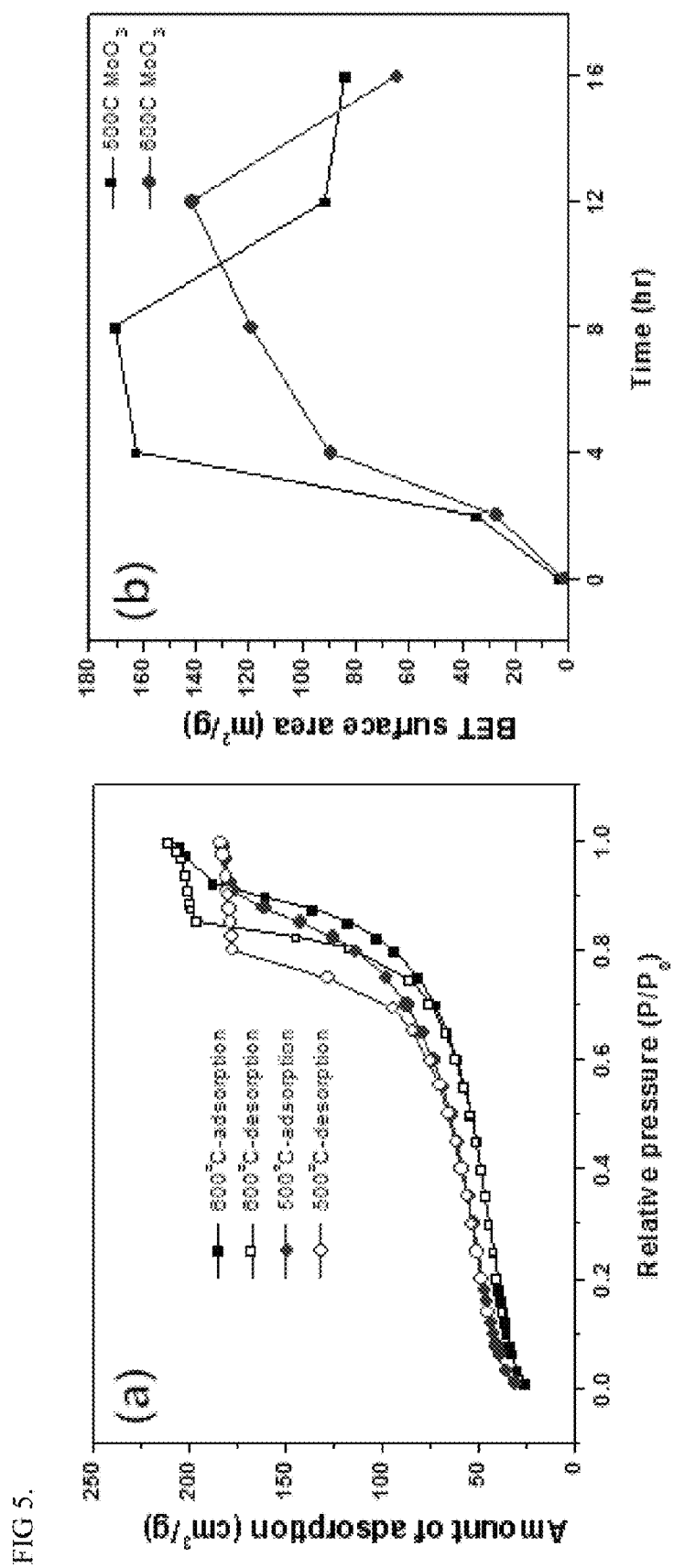
FIG. 5 illustrates results of evaluation of adsorption-desorption performance and BET surface analysis for molybdenum oxide nanoparticles according to an exemplary embodiment of the present invention.
Figure 6:
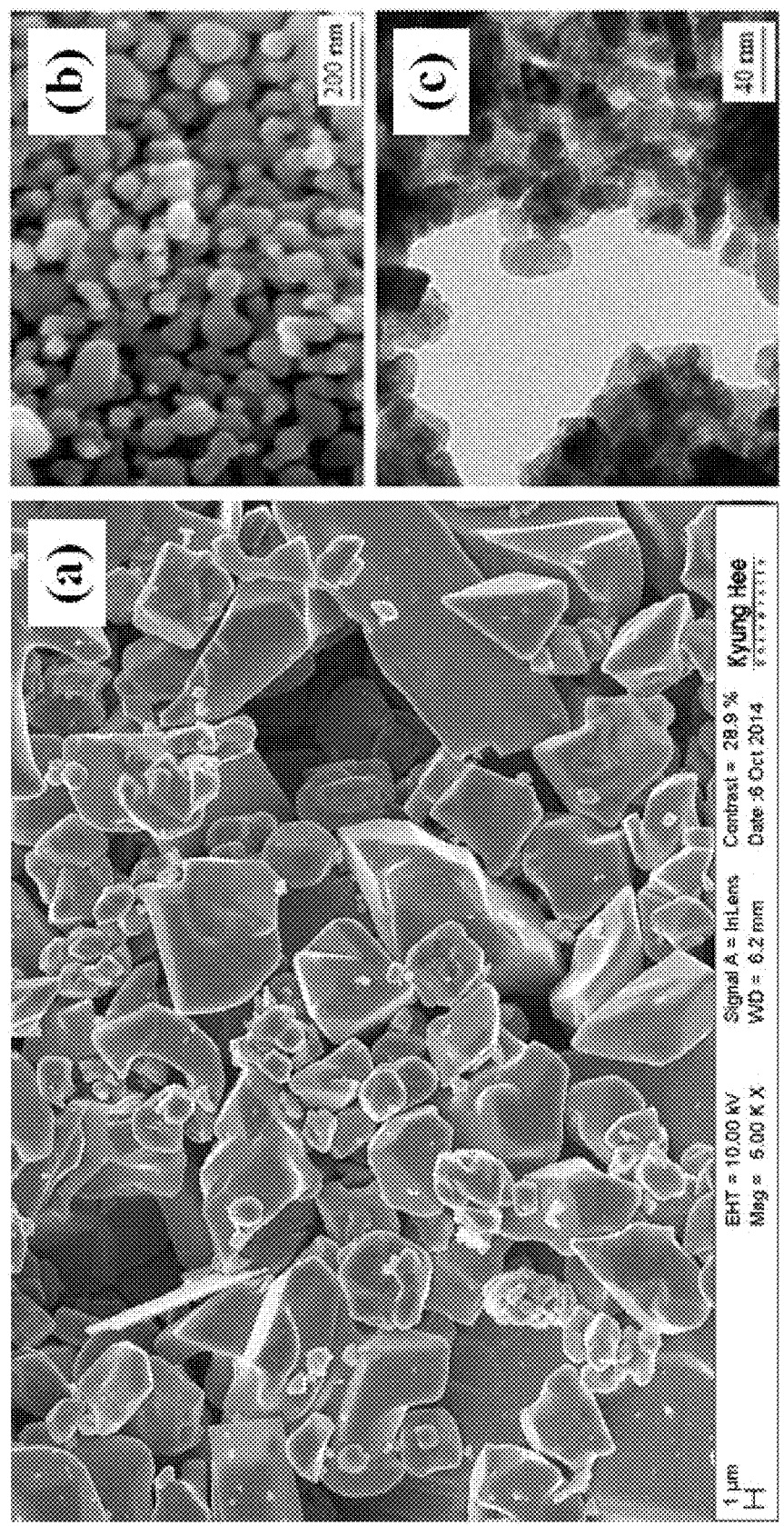
FIG. 6 illustrates SEM and TEM images of molybdenum oxide nanoparticles according to a comparative embodiment of the present invention.

In Example 1-1, Comparative Example 1-1, Example 2, Comparative Example 2, and Comparative Example 3, morphological changes and activity of the $MoO_2$ nanoparticles produced according to solvothermal reduction reaction time, a solvent used in the solvothermal reduction reaction, and crystallinity of the $MoO_3$ micron-sized particles were measured and analyzed and are shown in FIGS. 5 and 6 and Table 1. Measuring and analyzing methods are as follows.

Isotherm: Isotherm was measured using a $N_2$ adsorption-desorption instrument (ASAP 2020, Micromertics Instrument Co., Norcross, USA).

BET specific surface area: A specific surface area was measured by calculating the amount of nitrogen adsorption in a relative pressure ($P/P_0$) of 0.05 to 0.2 according to the BET method.

Pore size and pore volume: measured according to the Brarrett-Joyner-Halenda (BJH) method. A sample went through a pre-treating process before analysis, which is called a degassing process, in order to remove impurities and moisture in the sample. Here, the sample was heated at 90° C. for 2 hours, and then further heated at 150° C. for 1 hour. During the two-step degassing process described above, a heating rate was maintained at 5° C./min, a residual pressure was maintained at $1 \times 10^{-3}$ torr, and a cross-sectional area of a single $N_2$ molecule was calculated to be 0.162 mm$^2$.

TABLE 1

| Examples | Reaction time (h) | Pore volume (cm$^3$/g) | Pore size (nm) | BET specific surface area (m$^2$/g) |
|---|---|---|---|---|
| Example 1-1 | 2 | 0.067 | 9.82 | 27.35 |
| (600° C.) | 4 | 0.26 | 11.58 | 89.6 |
|  | 8 | 0.351 | 11.77 | 119.5 |
|  | 12 | 0.316 | 8.92 | 141.76 |
|  | 16 | 0.285 | 17.63 | 64.63 |
| Comparative Example 1-1 | 12 (H$_2$O only) | 0.033 | 14.26 | 9.5 |
| Example 2 | 2 | 0.093 | 10.71 | 34.55 |
| (500° C.) | 4 | 0.286 | 7.05 | 162.23 |
|  | 8 | 0.283 | 6.64 | 170.14 |
|  | 12 | 0.296 | 11.57 | 102.35 |
|  | 16 | 0.317 | 15.11 | 83.77 |
| Comparative Example 2 | 12 (H$_2$O only) | 0.037 | 10.71 | 13.87 |
| Comparative Example 3 | 12 | — | 20.00 | 48.0 |

Referring to Table 1 and FIG. 5, it can be seen that the MoO$_2$ nanoparticles prepared by reducing the polycrystalline MoO$_3$ micron-sized particles synthesized at 600° C. had the largest pore volume, pore size, and BET specific surface area in the range of solvothermal reduction reaction time from 8 to 12 hours. It can be seen that the MoO$_2$ nanoparticles prepared by reducing the polycrystalline MoO$_3$ micron-sized particles synthesized at 500° C. may have the same results as described above in the range of solvothermal reduction reaction time from 4 to 8 hours.

Meanwhile, FIG. 6(a) is an SEM image of commercially-available monocrystalline MoO$_3$ micron-sized particles, and FIGS. 6(b) and 6(c) are SEM and TEM images of MoO$_2$ nanoparticles synthesized therefrom, respectively, respectively. Referring to Table 1 and FIG. 6, MoO$_2$ nanoparticles synthesized in Example have pore sizes smaller than and increased in BET specific surface area approximately twice or more than the MoO$_2$ nanoparticles synthesized in Comparative Example 3, and therefore the performance of the nanoparticles is expected to be greatly improved in the potential applications such as adsorbents, catalysts, battery electrodes, etc.

It would be understood by those of ordinary skill in the art that the above descriptions of the present invention are exemplary, and the example embodiments disclosed herein can be easily modified into other specific forms without changing the technical spirit or essential features of the present invention. Therefore, it should be interpreted that the example embodiments described above are exemplary in all aspects, and are not limitative. For example, components described in singular forms may be dispersed, and likewise, components described to be dispersed may also be connected.

The scope of the present invention is represented by the following claims, and it should be interpreted that all the changed or modified forms derived from the meaning and scope of the claims and its equivalent concept are included in the scope of the present invention.

A method for preparing molybdenum oxide nanoparticles according to an exemplary embodiment of the present invention uses a spray pyrolysis method and a solvothermal cracking method together, and therefore molybdenum oxide nanoparticles having a large surface area and uniform particle size distribution can be produced on a large scale with high purity.

It should be understood that the effects of the present invention are not limited to the above-described effects and include all of the effects deducible from the configuration of the present invention disclosed in the detailed description or claims of the present invention.

What is claimed is:

1. A method for preparing molybdenum oxide nanoparticles, comprising:
    (a) preparing a precursor solution by dissolving a molybdenum salt in a first polar solvent;
    (b) generating an aerosol by applying ultrasonic waves to the precursor solution, and spraying the aerosol to a pre-heated reactor using a carrier gas;
    (c) obtaining molybdenum oxide micron-sized particles by pyrolyzing the aerosol; and
    (d) obtaining molybdenum oxide nanoparticles by dispersing the molybdenum oxide micron-sized particles in a second polar solvent and performing a solvothermal reduction reaction,
    wherein the molybdenum oxide micron-sized particles are polycrystalline,
    wherein a BET specific surface area of the molybdenum oxide nanoparticles is at least 100 m$^2$/g.

2. The method of claim 1, wherein the molybdenum salt is one selected from the group consisting of lithium molybdate (Li$_2$MoO$_4$), calcium molybdate (CaMoO$_4$), potassium molybdate (K$_2$MoO$_4$), sodium molybdate (NaMoO$_4$), molybden chloride (MoCl$_5$, MoCl$_3$, MoOCl$_4$), ammonium molybdate ((NH$_4$)$_6$Mo$_7$O$_{24}$.H$_2$O), and a mixture thereof.

3. The method of claim 1, wherein the first polar solvent is one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethylsulfoxide, distilled water, and a mixture thereof.

4. The method of claim 1, wherein a concentration of the precursor solution is in a range of 0.05 to 0.5 M.

5. The method of claim 1, wherein the carrier gas is one selected from the group consisting of air, nitrogen, oxygen, helium, argon, and a mixture thereof.

6. The method of claim 1, wherein, in the step (c), the pyrolysis temperature is in a range of 450 to 650° C.

7. The method of claim 1, wherein, in the step (c), the molybdenum oxide micron-sized particles are molybdenum trioxide (MoO$_3$).

8. The method of claim 1, wherein the second polar solvent is a mixture of distilled water and a reducing solvent.

9. The method of claim 8, wherein the second polar solvent is prepared by mixing the distilled water and the reducing solvent in a weight ratio of 1 to 3:1.

10. The method of claim 6, wherein, in the step (c), the pyrolysis temperature is in a range of 560 to 640° C.

11. The method of claim 10, wherein, in the step (d), the solvothermal reduction reaction is performed at least for 10 hours.

12. The method of claim 6, wherein, in the step (c), the pyrolysis temperature is in a range of 460 to 540° C.

13. The method of claim 12, wherein, in the step (d), the solvothermal reduction reaction is performed at least for 2 hours.

14. The method of claim 1, wherein, in the step (d), the solvothermal reduction reaction temperature is in a range of 100 to 300° C.

15. The method of claim 1, wherein the molybdenum oxide nanoparticles are represented by Formula 1:

$$MoO_{3-X} \quad \text{[Formula 1]}$$

where X is $0 < X \leq 1$.

* * * * *